Patented Aug. 13, 1940

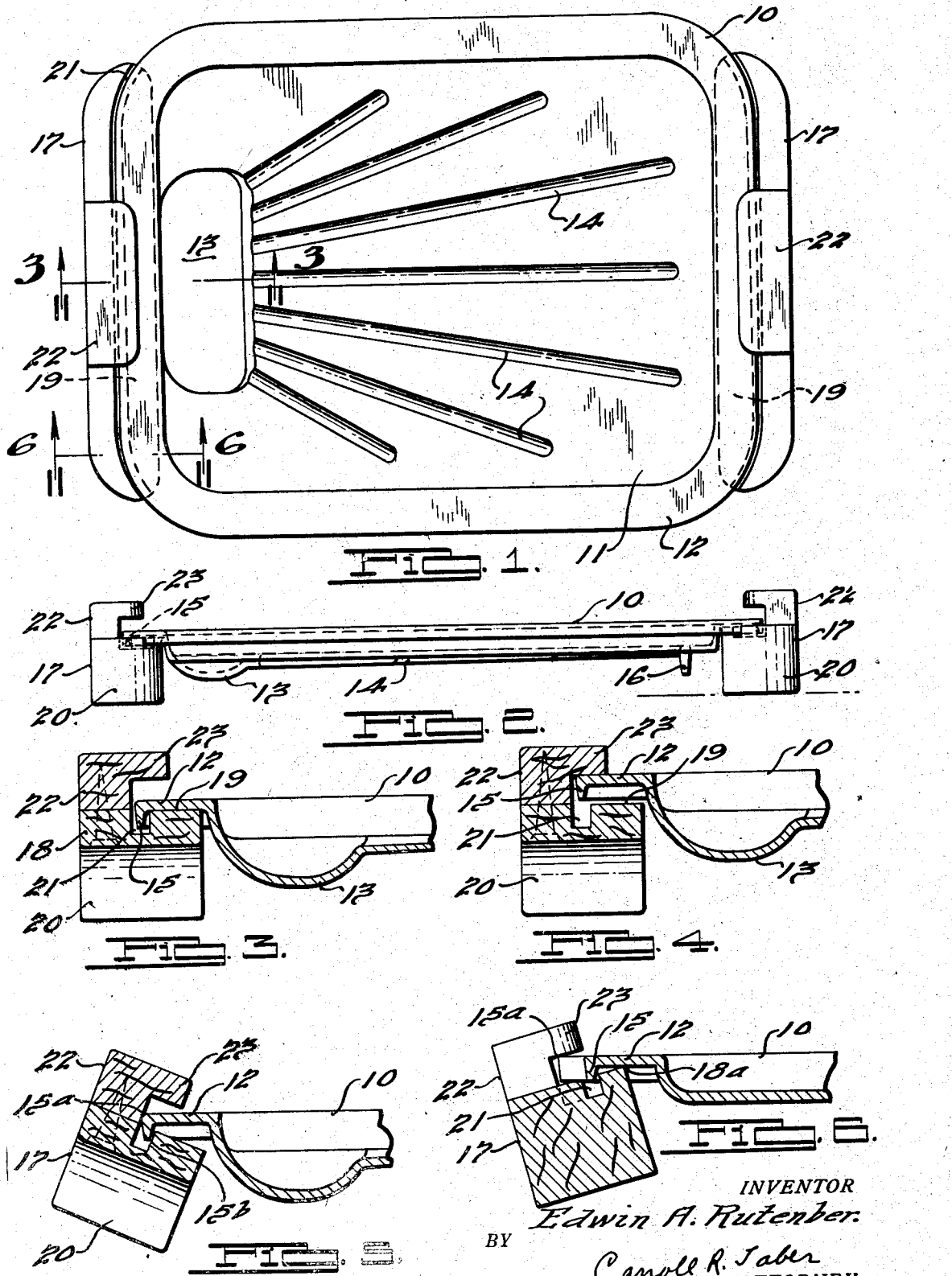

2,211,030

UNITED STATES PATENT OFFICE 2,211,030

BROILER PLATE AND HANDLE THEREFOR

Edwin A. Rutenber, Greenville, Mich., assignor to Gibson Electric Refrigerator Corporation, Greenville, Mich., a corporation of Michigan Application September 11, 1939, Serial No. 294,252

7 Claims. (Cl. 53—5)

This invention relates to a broiler plate and handles for the same, and more particularly to a novel interlocking engagement between the two. The principal object of the invention is to provide handles which can be readily attached to and detached from the broiler plate when desired, but which cannot be accidentally displaced or removed when the plate is used in its intended manner. Another object is to provide handles for a broiler plate which act as supporting means for the plate to hold the same clear of a table or like support. A further object is to provide a pair of easily gripped, readily detachable, heat insulating handles for a metallic broiler plate. Still another object is to provide a combination broiler plate and serving platter having a pair of handles therefore of attractive appearance.

These objects and others ancillary thereto will more fully appear from an examination of the following specification when read in connection with the accompanying drawing, wherein—

Figure 1 is a plan view of a broiler plate embodying this invention and showing the detachable handles in their normal position relative to the plate;

Figure 2 is a side elevational view of the structure shown in Figure 1;

Figure 3 is a cross-sectional view taken on substantially the line 3—3 of Figure 1;

Figure 4 is a cross-sectional view taken on substantially the line 3—3 of Figure 1 but showing the broiler plate in its raised position relative to the handle and ready to be removed therefrom;

Figure 5 is a cross-sectional view of the device taken in substantially the same position as Figures 3 and 4 but showing the handle tilted in one direction from its normal horizontal position; and Figure 6 is a cross-sectional view taken on substantially the line 6—6 of Figure 1 but showing the handle tilted in a direction opposite to that of Figure 5.

The present invention is herein shown and described as residing in a broiler plate 10 having detachably connected thereto at the opposite ends thereof a pair of handles 17. The plate 10 is of generally rectangular shape having a depressed central portion 11 surrounded by a flat horizontal rim 12. The rim 12 has a vertical flange 15 extending downwardly therefrom.

The central portion 11 of the plate 10 is provided with a cavity 13 adjacent one end thereof. Communicating with the cavity 13 are a plurality of grooves 14 which serve to collect and transmit to the cavity 13 the juices from meats cooked on the broiler plate. Extending from the lower surface of the plate 10 adjacent the end opposite the cavity 13 is a pair of depending lugs 16. The lugs 16 and lower surface of cavity 13 support the plate in a substantially horizontal position when the latter is placed on a horizontal support.

The handles 17 for detachably engaging the opposite ends of the plate 10 are identical to each other. While the handles 17 are here shown as being made of wood, they may be made of any other heat insulating material if desired.

Each handle 17 comprises a main body portion 18 having a flat upper surface 19. Extending downwardly from each end of the body portion 18 is a leg 20. The combined height of the legs and the main body portion is greater than the greatest thickness of the plate 10 in order that when the plate rests on the handles in the manner to be described presently, the plate will be supported clear of a surface on which the handles rest. Extending longitudinally of the main body portion 18 is a groove 21, this groove being curved lengthwise to the shape of the marginal flange 15 on the edge of the plate 10. The groove 21 is slightly wider and deeper than the marginal flange 15.

Secured to the upper surface 19 of the main body portion 18 in a zone outwardly of the groove 21 is an upstanding block 22. This block has an inwardly extending offset lip 23 which overlies a portion of the groove 21, rim 12, and marginal flange 15. The vertical space between the lip 23 and the upper surface 19 of the body portion 18 is slightly greater than the vertical dimension of the marginal flange 15 (see Figure 4). The block 22 is here shown as being a separate piece secured to the main body by screws shown in dotted lines. It will, of course, be understood that the parts may be fabricated as a unit. Therefore, the reference in the specification and claims to the block 22 is not to be understood as defining a part which is fabricated independently of the main body 18.

The handle 17 is readily attached to the plate 10 by sliding the handle horizontally onto one end of the plate 10 into the position indicated in Figure 4 and then moving the two vertically relative to each other so that flange 15 enters groove 21. At the start both plate and handle must be arranged substantially horizontal and with the top surface of the rim 12 and lower surface of the lip 23 in substantially juxtaposed parallel relation. When the handle is in the position shown in Figure 4, it may then be moved vertically relative to the plate 10 into the position shown in Figure 3. The handle and plate may be separated by relative movement thereof in a manner exactly the reverse of that just described.

Once the handles 17 have been installed on the plate 10, they cannot be removed so long as the weight of the plate 10 is supported by the handles. When the parts are in the position shown in Figure 3 it will be evident that the handle cannot be removed from the plate by pulling in a horizontal direction because of the interlocking engagement between the groove 21 and the marginal flange 15. Likewise, it is impossible to remove the handle when it is tilted in either direction relative to the plate 10.

Figure 5 shows the handle tilted in one direction. It will be evident that in this position the handle cannot be removed horizontally because the upper left hand corner 15a of the marginal flange 15 and the lower right hand corner 15b engage opposite walls of the groove 21. If an attempt is made to lift the marginal flange 15 out of the groove 21 the inner edge of the lip 23 engages the top surface of the rim 12.

If the handle is tilted in the opposite direction, as shown in Figure 6, the upper left hand corner 15a of the marginal flange engages the lower surface of the lip 23, and the right hand upper corner 18a of the body portion 18 engages the lower surface of the flat rim 12. Thus, the parts cannot be detached by relative movement in a vertical direction. At the same time the marginal flange 15 is interlocked in the curved ends of the groove 21 to prevent the handle from being pulled from the plate 10 in a horizontal direction.

Thus, it will be seen that in order to remove the handles 17 from the plate, they must be arranged properly with respect to each other and the parts then moved relatively to each other first in a vertical direction and then in a horizontal direction. So long as the weight of the plate 10 is supported by the handles 17, the handles cannot be detached from the plate. Thus there is no possibility of accidental detachment of the handles from the plate.

In addition to the foregoing, this invention has the advantage of providing a handle which is readily attachable to and detachable from the plate, and which forms a convenient method of carrying and supporting the plate, and thus obviates the necessity of providing an insulated pad when the plate is used on a dining table as a serving platter.

The scope of the invention is indicated in the appended claims.

1. The combination with a broiler plate having a flat rim and a depending marginal flange, of a readily removable insulating handle therefor, said handle having a slot therein to receive the rim and a separate slot communicating therewith to receive the depending marginal flange whereby to provide an interlocking engagement between said handle and plate of such character as to permit separation thereof only by relative movement of the two parts successively in two planes substantially normal to each other.

2. The structure set forth in claim 1 wherein the handle has a pair of spaced depending legs thereon of a length extending below the bottom of the plate when the plate is supported by the handles.

3. The combination with a broiler plate having a flat rim and a depending marginal flange, of a readily removable insulating handle therefor having a normally horizontal surface for supporting said rim, a vertical groove in said handle extending downwardly from said surface to receive said marginal flange, and means overlying said groove to limit the vertical movement of the parts when said marginal flange is positioned within said groove.

4. The combination with a broiler plate having a flat rim and a depending marginal flange, of a readily removable insulating handle therefor comprising an elongated main body portion having a normally horizontal upper surface, a portion of which is adapted to underlie and support said rim, a groove in said upper surface to receive said marginal flange, and an upstanding block on said upper surface, said block having an offset lip overlying a part of said groove and said flat rim and being spaced from said upper surface a distance slightly greater than the vertical width of said marginal flange, whereby to permit removal of said handle from said plate only when the top surface of the flat rim of said plate and the lower surface of the lip are in substantially juxtaposed parallel relation.

5. The combination with a broiler plate having a flat rim and a depending marginal flange, of a readily removable insulating handle therefor comprising an elongated main body portion having a normally horizontal upper surface, a portion of which is adapted to underlie and support said rim, a groove in said upper surface to receive said marginal flange, and an upstanding block on said upper surface, said block having an offset lip overlying a part of said groove and said flat rim and being spaced from said upper surface a distance slightly greater than the vertical width of said marginal flange whereby to permit removal of said handle from said plate only when the top surface of the flat rim of said plate and the lower surface of the lip are in substantially juxtaposed parallel relation, said main body portion having depending legs at its opposite ends extending below the plate when the plate is engaged by the handles.

6. The combination with a broiler plate having a flat rim and a depending marginal flange, of a readily removable insulating handle therefor comprising an elongated main body portion having a normally horizontal upper surface, a portion of which is adapted to underlie and support said rim, a groove in said upper surface to receive said marginal flange, and an upstanding block on said upper surface, said block having an offset lip overlying a part of said groove and said flat rim, the width of the groove relative to the thickness of the marginal flange and the spacing of the lip from the upper surface of the handle being proportioned whereby the outer upper corner and lower inner corner of the marginal flange engage opposite walls of the groove when the handle is tilted in one direction, and the outer upper corner of the marginal flange engages the under surface of the lip and the inner upper corner of the main body portion engages the under surface of the rim when the handle is tilted in the opposite direction.

7. The combination of a broiler plate and a readily removable handle therefor, said broiler plate having at one edge thereof laterally outwardly and downwardly extending L-shaped handle attaching means, said handle having a laterally inwardly and downwardly extending L-shaped recess receiving said handle attaching means, the vertical width of the laterally extending portion of the recess being at least as great as the vertical extent of the downwardly extending portion of the handle attaching means whereby to provide an interlocking engagement between said handle and broiler plate of such character as to permit separation thereof only by relative movement of the two parts successively in two planes substantially normal to each other.

EDWIN A. RUTENBER.